Sept. 6, 1938.  E. E. LOCKE  2,129,585
ADVERTISING DEVICE
Filed Jan. 3, 1938  2 Sheets-Sheet 2
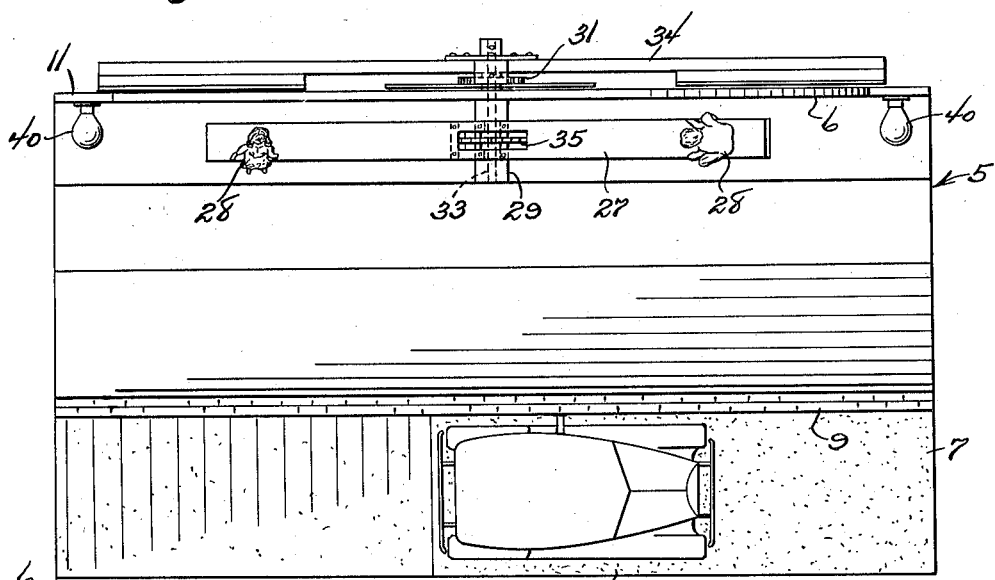
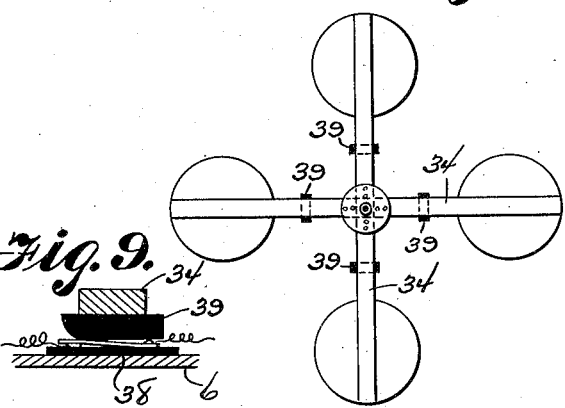
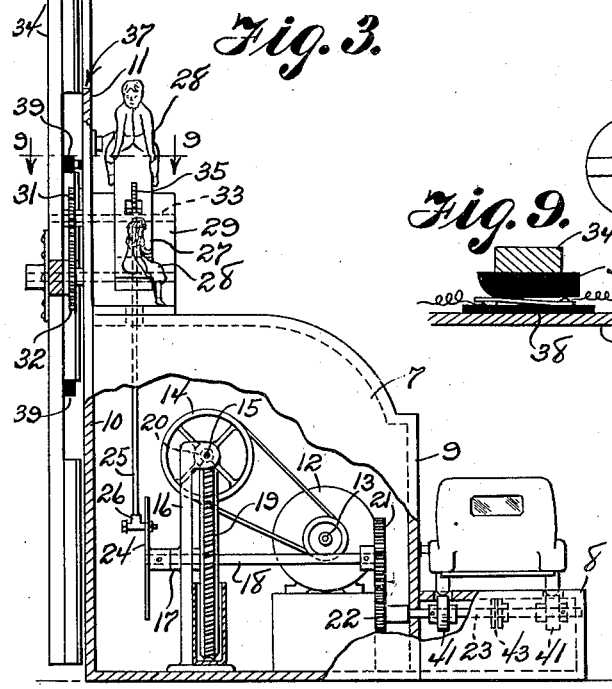
Earl E. Locke
INVENTOR
BY Victor J. Evans & Co.
ATTORNEYS Patented Sept. 6, 1938

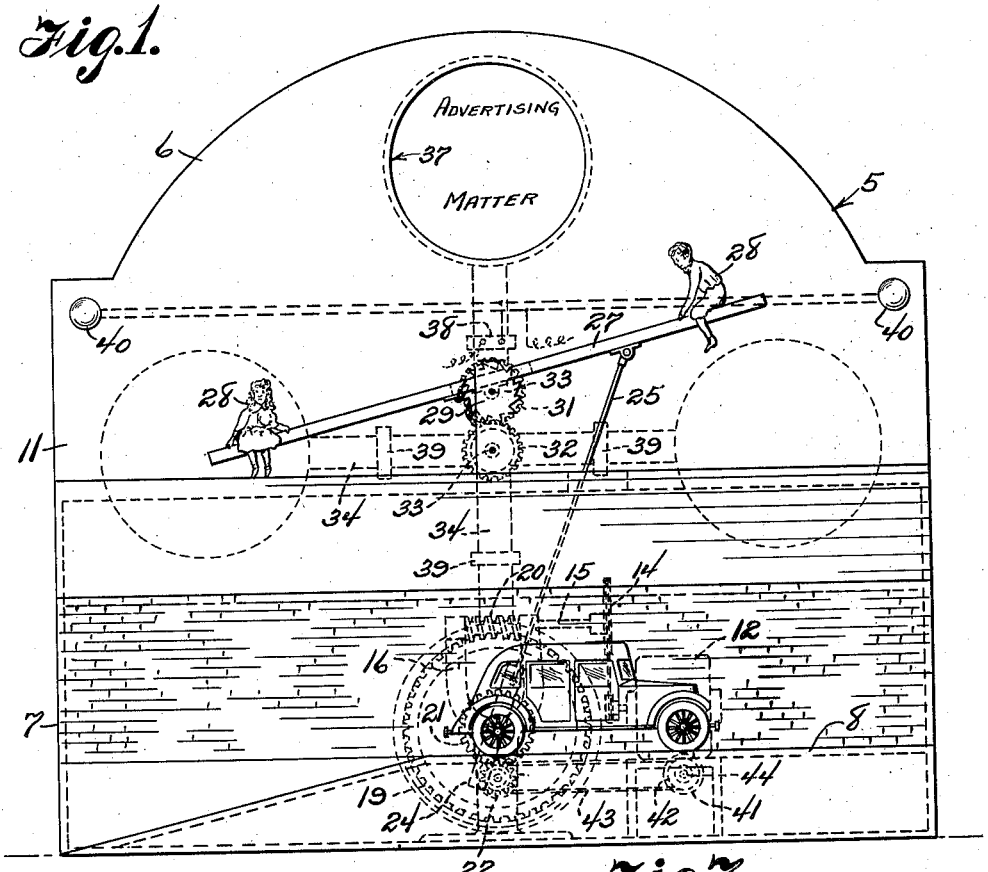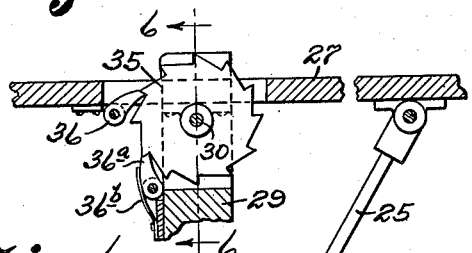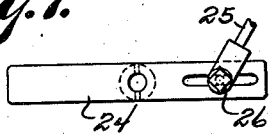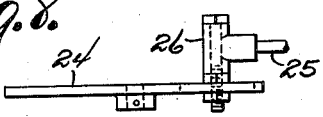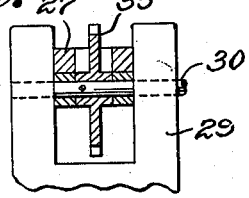

2,129,585

UNITED STATES PATENT OFFICE 2,129,585

ADVERTISING DEVICE

Earl E. Locke, Utica, Ill.

Application January 3, 1938, Serial No. 183,169

2 Claims. (Cl. 40—126)

My invention relates to new and useful improvements in advertising devices.

One of the principal objects of my invention is to provide an advertising device equipped with figures, models or the like adapted to be operated from a hidden power source whereby to simulate the appearance of operation by the models.

Another object of my invention is to provide a device of the above described character which is simple in construction, efficient in operation, attractive in appearance and curiosity arousing as well as directory to advertising matter displayed thereon.

Other objects and advantages will be apparent from the following description, appended claims and annexed drawings.

Referring to the drawings wherein like reference characters designate like parts throughout the several views:

Fig. 1 is a front elevation of my invention.

Fig. 2 is a top plan view thereof.

Fig. 3 is a side elevation partly in section.

Fig. 4 is a detail side elevation of the advertising indicia paddles.

Fig. 5 is a detail sectional view of the rachet mechanism carried by the walking-beam for operating the indicia paddles.

Fig. 6 is a detail sectional view taken on the line 6—6 of Figure 5.

Fig. 7 is a side elevation of the crank arm illustrating the adjustable connection of the crank rod thereto.

Fig. 8 is a top plan view of the structure illustrated in Figure 7.

Fig. 9 is a detail sectional view taken on the line 9—9 of Figure 3 illustrating the switch mechanism.

In practicing my invention I provide a scene 5 comprising upper and lower sections 6 and 7 respectively. Said lower section has an outwardly extending portion 8 simulating a bridge structure having a roadway leading thereto. Above said bridge structure, the lower section is constructed to simulate a brick wall serving as a retaining means for a simulated terraced lawn. The lower section is of hollow construction having front and rear walls 9 and 10 respectively, the rear wall 10 extending upwardly beyond the top of the lower section to form a background 11 constituting the upper section 6.

Within the lower section 7 there is mounted a motor 12 having a drive pulley 13 connected to a driven pulley 14 mounted on a driven shaft 15 journaled in the upper end of a standard 16 secured to the floor of the lower section. Intermediate the ends thereof, the standard 16 is fashioned with a bearing 17 in which is rotatably mounted a transverse shaft 18 having a gear 19 secured thereon meshing with a worm gear 20 carried by the shaft 15. Adjacent the outer end thereof, the shaft 18 is provided with a pinion gear 21 meshing with a similar gear 22 secured to a shaft 23 extending within the portion 8. The opposite end of the shaft 18 has secured to a crank arm 24 adjustably connected to one end of a crank rod 25 as at 26. The opposite or upper end of said crank arm is pivotally connected to an end section of a walking-beam 27 constituting the board of a miniture see-saw on the ends of which are mounted a pair of figures or models 28 simulating a boy and a girl. Said walking-beam is pivotally mounted within a bifurcated member 29 secured on the upper face of the lower section 7. A shaft 30 is loosely connected to the walking-beam and serves as a pivot therethrough, one end of the shaft extending through the upper section 6 and having secured thereon a gear 31 meshing with a gear 32 mounted on a shaft 33 journaled for rotation in the upper section. Secured to the shaft 33 are a plurality of radially extending arms 34 having disks secured to the ends thereof and constituting advertising indicia paddles.

The walking-beam 27 is slotted intermediate the ends thereof for receiving a ratchet wheel 35 fixed to the shaft 30. Said walking-beam has pivoted thereto a drive pawl 36 for engagement with said ratchet wheel whereby oscillating movement of said walking-beam serves to intermittently advance the ratchet wheel which in turn rotates shaft 30, gears 31 and 32 and actuates the indicia paddles. The upper section 6 is provided with an aperture 37 whereby advertising indicia contained on the disks of the paddles is displayed to view as each of the paddles rotate behind said aperture.

Subjacent the aperture 37 the rear face of the upper section 6 has secured thereto a switch 38 having a resilient blade adapted to engage a contact to close an electrical circuit by means of a shoe 39 carried by each of the arms 34 of the paddles. Connected within said electrical circuit is a plurality of electric lamps 40. Said lamps are alternately caused to light by the action of the shoe 39 closing the switch by engagement with the resilient switch blade.

The shaft 23 is journaled in the rear and front wall of the outwardly extending portion 8. Said shaft carries a pair of spaced pulleys 41 connected to a similar pair of pulleys 42 by means of belts 43. The pulleys 42 are secured to a shaft 44 likewise journaled in the front and rear walls of the portion 8. Said pulleys and belts constitute a treadmill, suitable slots being formed in the upper wall of the portion 8 whereby freely rotatable wheels of a model automobile, attached to said front wall 9 by an arm, engage the belts.

From the foregoing it will be apparent that when power is supplied to the motor 12, the same will, through the chain of connected mechanism heretofore set forth, reciprocate the crank rod 25 which in turn causes the walking-beam 27 to oscillate. Oscillation of the walking-beam in turn serves to rotate the indicia paddles and to cause the lamps 40 to flash on and off as heretofore described. During the operation of the walking-beam, the shaft 23, through the medium of the connected parts with the motor 12, will be rotated and in turn operate the treadmill. Operation of the treadmill serves to rotate the wheels of the automobile. The rotation of the wheels of the automobile serves to simulate the operation of the device by means of the automobile.

It is to be understood that while I have shown and described my invention as provided with a see-saw, automobile, bridge and of scenic representations, various other objects and the like may be depicted thereon, for instance fences, railings on the bridge, animals, various kinds of lights, flowers, etc. Furthermore, it is to be distinctly understood that various forms of advertising matter, for instance pictures, drawings and the like may be presented for view through the aperture 37 by being affixed to the disks of the paddles.

An auxiliary pawl 36a is secured to the member 29 and engages the ratchet wheel 35 to prevent reverse rotation thereof, said pawl being held in engagement with said ratchet wheel by means of a spring 36b.

What I claim is:

1. A device of the character described, comprising, a scene having upper and lower sections, said upper section fashioned with an opening, an oscillating member mounted on said upper section, a plurality of radially extending paddles pivotally mounted on said upper section and adapted to progressively register with said opening whereby advertising indicia on said paddles will be displayed to view through said opening, a gearing assembly including ratchet mechanism connecting said oscillating member to said paddles whereby said paddles are intermittently rotated, a treadmill secured without and in front of said lower section, a model automobile having wheels engaging said treadmill, and a power source within said lower section for operating said oscillating member and connected to said treadmill whereby to simulate the operation of said oscillating member by said model automobile.

2. A device of the character described, comprising, a scene having upper and lower sections, said upper section fashioned with an opening, a walking-beam mounted on said upper section, a plurality of radially extending paddles pivotally mounted on said upper section and adapted to progressively register with said opening whereby advertising indicia on said paddles will be displayed to view through said opening, a gearing assembly including ratchet mechanism connecting said walking-beam to said paddles whereby said paddles are intermittently rotated, a treadmill secured without and in front of said lower section, a model automobile having wheels engaging said treadmill, and a power source within said lower section for operating said walking-beam and connected to said treadmill whereby to simulate the operation of said walking-beam and said paddles by said model automobile.

EARL E. LOCKE.